United States Patent

Wilson

[15] 3,660,068

[45] May 2, 1972

[54] SOIL ADDITIVES

[72] Inventor: Joseph F. Wilson, Bartlesville, Okla.

[73] Assignee: Phillips Petroleum Company

[22] Filed: Dec. 29, 1969

[21] Appl. No.: 888,868

[52] U.S. Cl. .............................71/34, 23/122, 23/313, 71/63, 71/64 D, 71/64 DA
[51] Int. Cl. .............................C05b 7/00, C05d 3/00
[58] Field of Search ..............71/63, 64 D, 64 DA, 64 DC, 71/64 G, 34; 23/122, 313

[56] References Cited

UNITED STATES PATENTS

| | | | |
|---|---|---|---|
| 1,548,358 | 8/1925 | Edwards | 23/122 |
| 1,822,815 | 9/1931 | Lichtenberger et al. | 23/122 |
| 1,973,473 | 9/1934 | Edwards | 23/313 |
| 2,792,295 | 5/1957 | Wright | 71/64 G |
| 2,893,858 | 7/1959 | MacDonald et al. | 71/64 DA |
| 2,907,667 | 10/1959 | Johnson | 23/122 X |
| 2,913,308 | 11/1959 | Dartey et al. | 23/122 |
| 2,926,079 | 2/1960 | Smith | 71/64 DA |
| 2,935,387 | 5/1960 | Phillips | 71/64 DC |
| 3,004,827 | 10/1961 | Schaus | 23/122 |
| 3,081,152 | 3/1963 | Johnson | 23/122 |
| 3,241,947 | 3/1966 | Young | 71/63 X |
| 3,326,633 | 6/1967 | Carothers et al. | 23/122 |
| 3,334,988 | 8/1967 | Newsom | 71/63 |
| 3,480,387 | 11/1969 | Yasutake et al. | 23/122 |

FOREIGN PATENTS OR APPLICATIONS

| | | | |
|---|---|---|---|
| 743,867 | 10/1966 | Canada | 23/122 |
| 802,105 | 12/1968 | Canada | 23/122 |
| 208,779 | 3/1927 | Great Britain | 23/122 |
| 1,189,902 | 6/1967 | Great Britain | 23/122 |

*Primary Examiner*—Reuben Friedman
*Assistant Examiner*—Richard Barnes
*Attorney*—Young and Quigg

[57] ABSTRACT

A method of preparing a granulated soil additive of calcium sulfate and a soluble salt, preferably a fertilizer, which involves granulating the calcium sulfate employing the soluble salt, incorporated with the calcium sulfate in solution form, as the granulating agent.

3 Claims, No Drawings

SOIL ADDITIVES

This invention relates to soil additives.

In one of its more specific aspects, this invention relates to granulated additives for soil improvement.

The use of granulated fertilizers and the improvement obtained upon their addition to the soil is well known. Frequently, the addition to the soil of agents other than fertilizers is desired. One of these which it is frequently desired to add is sulfur. However, many of the forms in which sulfur could be added to the soil are insoluble in water and not readily granulated by conventional methods.

One of the insoluble forms in which sulfur occurs in large quantities is by-product gypsum, or calcium sulfate produced, for example, as the by-product from phosphoric acid production. However, because of the limited solubility of gypsum, it is not adaptable to granulation from aqueous solutions. While certain processes are directed to the production of granulated fertilizer including gypsum, the method of this invention provides an advance over the methods of doing so.

According to this invention there is provided a method of preparing a granulated soil additive which comprises mixing a solution of the soluble salt with the calcium sulfate, granulating the mixture, and recovering the granulated soil additive.

Accordingly, it is the object of this invention to provide an improved soil additive.

It is another object of this invention to provide a novel method by which sulfur compounds can be made usable as soil additives.

The method of this invention produces hard, well-shaped granules of desirable size comprising gypsum and a soluble salt. Any soluble salt whose incorporation in the soil is unobjectionable can be employed as the granulating agent, although the use of materials commonly employed as fertilizers, for example, ammonium nitrate or diammonium phosphate, are preferably employed.

The solution of the granulating agent is mixed with the gypsum and the resulting mixture is granulated in conventional equipment while drying, auxiliary drying being employed as necessary to adjust the water content of the final product. Size separation and recycling of off-size granules to the granulation step can be employed.

The method of this invention contemplates the addition of the granulating solution to the gypsum, the gypsum preferably containing from about 15 to about 22 percent free water, preferably from about 17 to about 20 percent free water, the gypsum being wet as recovered from phosphoric acid production, or having had water added to its from an extraneous source. This gypsum can have contained in it quantities of phosphoric acid or solid extraneous materials such as limestone, carbon black, etc. Preferably, the gypsum will be in the form of a powder with about 70 percent having a Tyler Number of about −100 and little, if any, having a Tyler Number greater than 20 mesh.

Any number of soluble salts can be employed as the granulating agent. Suitable salts are ammonium nitrate, ammonium phosphate, diammonium phosphate, urea, potash or suitable mixtures thereof, preferably as conventionally employed as commercial fertilizers. These granulating agents are added to the gypsum in amounts of from about 10 weight percent to about 30 weight percent of the weight of the final granule.

They are added to the gypsum in the form of a solution in any suitable solvent, preferably in the form of an aqueous solution, the solution preferably being at or near its saturation point in respect to the solubility of the granulating agent therein. The amount of solution sufficient to produce granulation is added to the calcium sulfate, this amount generally being such as to form a wet mixture comprising between about 15 and about 25 weight percent water. Inasmuch as a principal portion of the solvent is removed from the granules by evaporation, the solution of the granulating agent can be added to the gypsum at or near the solution's boiling point. For example, aqueous solutions are generally added to the gypsum at temperatures of from about 170° F. to about 212° F.

The solution of the granulating agent is added to and mixed with the gypsum in any suitable manner. This can be done by spraying the solution onto a tumbling bed of gypsum, the tumbling being continued until suitable mixing results, after which the mixture is introduced into granulating apparatus from which it is recovered in desired granule sizes. Particles larger and smaller than desired can be reintroduced into the mixing step. Drying of the granules can be carried out until the product contains from about 0.5 to about 3 percent of solvent based upon the total weight of the granule.

Table I indicates the results achieved when granulating gypsum with various granulating agents employing the method described, under the conditions indicated.

TABLE I

| Run No. | Granulating agent | Water in mixture at granulation, wt. percent | Other inclusions | Product, dry basis, wt. percent | | | Granulating temp., ° F. | Product screen size, wt. percent | | |
|---|---|---|---|---|---|---|---|---|---|---|
| | | | | Gypsum | Additive | Other | | +6 | −6+14 | −14 |
| 1 | Fertilizer 18-46-0 * | 17.1 | 0 | 85.0 | 15.0 | 0 | 190 | 50.6 | 43.1 | 6.3 |
| 2 | Ammonium nitrate | 18.4 | 0 | 90 | 10 | 0 | 190 | 35.6 | 46.6 | 17.8 |
| 3 | Urea | 18.0 | 0 | 80 | 20 | 0 | 190 | 21.8 | 58.6 | 19.6 |
| 4 | Ammonium nitrate | 23.7 | Limestone | 79.1 | 9.2 | 11.7 | 170 | 55.2 | 21.6 | 23.2 |
| 5 | Urea | 14.8 | Limestone | 72.0 | 18.0 | 10.0 | 190 | 27.1 | 53.7 | 19.2 |
| 6 | Diammonium phosphate | 18.0 | 0 | 80 | 20 | 0 | 185 | 21.6 | 22.4 | 56.0 |

*Commercial fertilizer, numerals denoting percentages of N, $P_2O_5$ and $K_2O$.

The data of Table I illustrate that a wide variety of granulating agents, including commercial fertilizers, can be employed and that extraneous particulate materials can be incorporated in the granules. In all instances, granule hardness was equal to that of commercially acceptable fertilizers, being from about 0.3 to 1.5 psi, in some instances, being as high as 4.0 psi.

One of the prior art methods involves granulation of unwashed gypsum filter cake containing residual phosphoric acid using ammonium phosphate as the granulating agent. The ammonium phosphate is formed in situ by neutralizing the phosphoric acid with ammonia. A comparison of that method and that of the present invention illustrates the unexpected superior results of the method of the present invention.

In accordance with that prior art method, wet-process phosphoric acid by-product gypsum containing about 18 weight percent water and 15.5 weight percent orthophosphoric acid was neutralized by spraying with anhydrous ammonia employing a sparger submerged in the wet solids. This neutralization formed diammonium phosphate in the amount of about 17 weight percent of the total mixture.

For comparative purposes, the method of the present invention was carried out by adding diammonium phosphate in the form of an aqueous solution to a different sample of the same wet-process phosphoric acid gypsum cake. In both instances, the gypsum, after addition of the granulating agent and prior to granulating, contained substantially the same quantity of diammonium phosphate.

In both instances, the granulation and drying steps were substantially identical. However, as shown in the data of Table II, the method of this invention was unexpectedly superior in respect to the properties of the granulated products.

TABLE II

| Component | This Invention | Prior Art |
|---|---|---|
| Gypsum, Wt. %, Dry | 65.4 | 65.4 |
| 85% $H_3PO_4$ Present, g. | 0 | 15.5 |
| Ammonia Added, g. | 0 | 3.4 |
| Diammonium Phosphate Added, g. | 16.6 | 0 |
| Equivalent Diammonium Phosphate Added, g. | 16.6 | 16.6 |
| Water, g., Total | 18.0 | 18.0 |
| Granulated Product Properties | | |
| pH | 5.3 | 2.7 |
| Screen Analysis, Tyler No. | | |
| +6 | 21.6 | (100% in |
| −6 to +14 | 22.4 | (form of |
| −14 to +20 | 5.5 | (1.5″ to 2″ |
| −20 | 50.5 | (diam. spheres. |

In both instances, granulation was conducted at temperatures up to the maximum possible without the formation of an agglomerated mass. In the method of the present invention, a granulation temperature of about 180° F. was employed; in the prior art method, the maximum granulation temperature was limited to about 130° F.

It will be noted from the above that the method of this invention formed granules within those size ranges conventionally acceptable as commercial fertilizer. The prior art method, however, formed agglomerates, generally spheroidal, but of entirely unsatisfactory size for use as commercial fertilizer. The difference in pH values of the two granulated products is accountable by the fact that the formation of these large diameter particles in the prior art method prevented the thorough mixing and total neutralization of the ammonia with the acid on the gypsum and indicates a nonuniform product.

The method of this invention can employ any conventional apparatus for granulation such as pan granulators and drum granulators, the granulating agent additive being introduced into the granulator.

It will be evident from the foregoing that various modifications can be made to the method of this invention. Such, however, are considered as being within the scope of the invention.

What is claimed is:

1. A method of preparing a granulated soil additive which comprises
   a. introducing gypsum containing from about 15 to about 22 percent water into a granulator, about 70 weight percent of said gypsum having a Tyler number of about −100;
   b. introducing into contact with said gypsum to form a wet mixture an aqueous solution of a salt, said solution being introduced in an amount sufficient to provide a salt content of from about 10 to about 30 weight percent of an after-defined, granulated soil additive, said wet mixture containing from about 15 to about 25 weight percent water;
   c. granulating said mixture; and,
   d. drying the granules at a temperature of about 180° F. to produce a granulated soil additive containing from about 0.5 to about 3 weight percent water.

2. The method of claim 1 in which said salt is selected from the group consisting of ammonium nitrate, ammonium phosphate, diammonium phosphate, urea, potash and mixtures thereof.

3. The method of claim 1 in which said gypsum comprises unwashed gypsum containing phosphoric acid and said salt is diammonium phosphate.

* * * * *